THERMAL STABILIZATION OF DIRECT-COUPLED ELECTROMETER AMPLIFIERS

Filed March 27, 1963

INVENTOR
Ko-Hsin Liu
By Charles M. Hutchins
ATTORNEY

United States Patent Office 3,275,942

Patented Sept. 27, 1966

3,275,942

THERMAL STABILIZATION OF DIRECT-COUPLED ELECTROMETER AMPLIFIERS

Ko-Hsin Liu, Hilliard, Ohio, assignor to Industrial Nucleonics Corporation, a corporation of Ohio Filed Mar. 27, 1963, Ser. No. 268,318
11 Claims. (Cl. 330—1)

Figure 1:
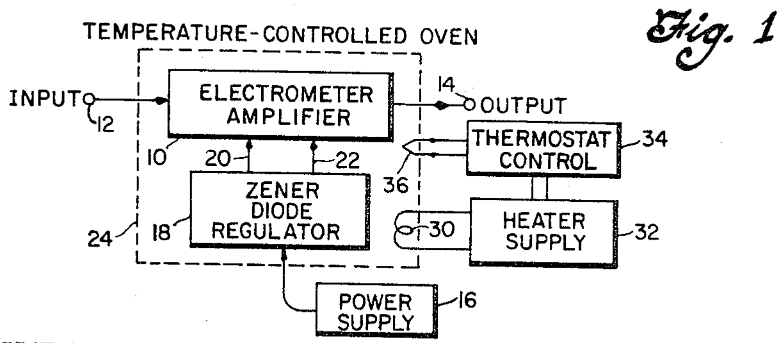

This invention relates generally to electronic amplifiers and more specifically to a direct-coupled amplifier system having improved operating stability characteristics.

D.C. amplifiers and especially electrometer amplifiers have seen increasing usage in industrial gauges for detecting material properties. Performance of these gauges requires the detection of small changes in the material being measured. The extremely minute current available, for example, from an ionization chamber, requires an electrometer amplifier having a high input impedance. The electrometer amplifier usually serves to match the relatively high impedance of an ionization chamber to the low impedance input of available recorders.

These amplifiers tend to drift during operation, and the resultant instability hampers measurement of the variable of interest. Measurement instability affects the accuracy of associated automatic controller units. Vibrating capacitor electrometer amplifiers have been used but they are relatively expensive and generally they have a low cutoff frequency. D.C. electrometer amplifiers have been utilized but they have been troubled by drift in both gain and zero setting. Moreover, these amplifiers have required precision components and extensive power supply regulation to provide the required stability. Normally, the stability of gas regulator tubes as taken from a graph of voltage vs. temperature reveals figures no less than 0.001% per degree centigrade. In the small signal industrial application set forth hereinabove, this stability figure is much too high to provide drift-free operation of the measuring system.

Since it is the inevitable ambient temperature change which is the principal cause of the aforesaid drift, the present invention is particularly directed to an improved electrometer amplifier utilizing substantially unity negative feedback and operating in a temperature-controlled environment. Both the power supply for the amplifier and the bucking voltage supply in the feedback loop are stabilized by temperature-compensated zener diodes.

Accordingly, it is a primary object of the present invention to provide a substantially drift-free direct-coupled amplifier.

It is another object of the present invention to provide a stable electrometer amplifier which does not require extensive power supply regulation circuitry.

It is also an object of the present invention to provide a stable electrometer amplifier which is insensitive to changes in ambient temperature.

It is yet another object of the present invention to provide a stable electrometer amplifier which does not require the use of expensive precision components.

It is still another object of the present invention to provide a stable electrometer amplifier which is simple to construct and readily adaptable to existing gauging devices.

Figure 2:
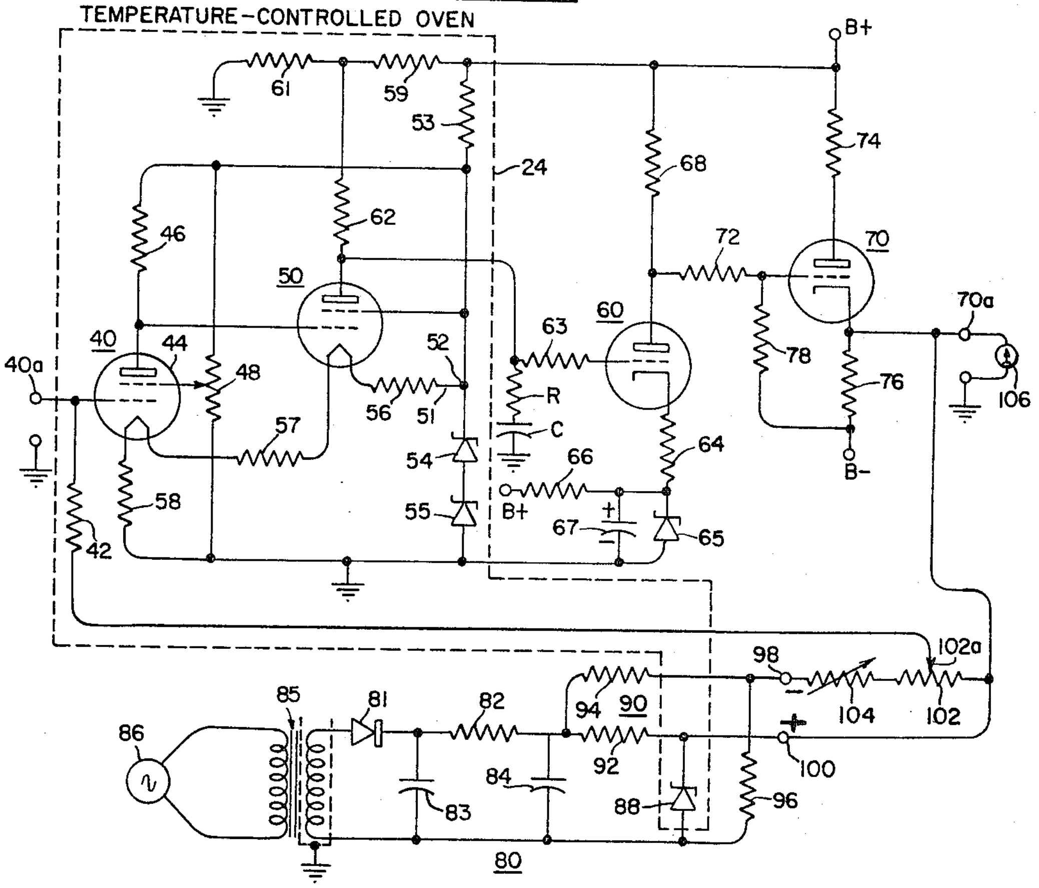

These and other objects and advantages of the present invention will become more apparent when the following description is taken in conjunction with the appended drawing, in which:

FIG. 1 is a block diagram of an electrometer amplifier constructed in accordance with the present invention; and FIG. 2 is a circuit diagram showing the amplifier of FIG. 1 in greater detail.

To illustrate the salient features of the present invention, reference may be had specifically to the block diagram of FIG. 1. An electrometer amplifier 10 having input and output terminals 12 and 14 is connected to a source of operating potential represented conventionally by the power supply 16. In accordance with the present invention, a zener diode regulator unit 18 connects the power supply 16 to the electrometer amplifier 10 and serves to supply filament and plate potentials via lines 20 and 22 respectively. The amplifier 10 and zener regulator 18 are housed in a temperature-controlled oven represented by the dotted line 24 to shield these units from changes in the ambient temperature of the surrounding environment which inevitably occur in any industrial gauging application. The established isothermal environment together with the zener regulation provides an acceptable degree of stability.

An oven temperature above any expected ambient temperature may be maintained by any suitable means such as a heating coil 30. Electrical power for the heating coil may be provided by a heater supply 32. Heater supply 32 is regulated by a known type of thermostatic unit 34, having at least a temperature responsive device 36 in the interior of the oven 24. The electrical system shown may, of course, be replaced by a thermostatically-controlled warm air blower arrangement. In any event, the temperature can easily be controlled within $\pm 1°$ centigrade by commercially-available apparatus. This small change in temperature of the established environment permits the use of non-precision components. Moreover, by using temperature-compensated zener diodes within the regulator 18, operating potentials to the amplifier 10 are stabilized to within a few parts in one million, as will be more fully described in connection with the circuit diagram of FIG. 2.

Referring to FIG. 2, the electrometer system comprises three direct-coupled stages of amplification 40, 50, and 60 and a cathode follower output stage 70. Feedback is provided via a suppression voltage network 80 which applies a bucking potential between the cathode of the output stage 70 and a high-ohmage resistor 42 tied to the input terminal 40*a*. The first two preamplifier stages 40 and 50 as well as the high resistance 42 are housed in the temperature-controlled oven 24. Briefly, the system utilizes a null balance suppression technique to determine the magnitude of potential developed by an unknown signal current entering the input terminal 40*a* and flowing through the high-ohmage resistor 42. The amount of voltage required to make the output terminal 70*a* substantially ground potential is indicative of the magnitude of signal current flowing into the system.

An electrometer tube 44 is used for the first stage as an impedance matching device between the input transducer and the amplifier. The potential across the first stage plate load resistor 46 is direct-coupled to the second stage 50 and the filament current of both stages is conducted over line 51. Line 51 is connected to a point 52 which is the junction of a resistor 53 tied to B+ and a series combination of temperature-compensated zener diodes 54 and 55. The filaments of both preamplifier stages are alternately connected in series with resistors 56, 57, and 58 between point 52 and ground. The resistor 58 allows the grid of the electrometer tube 44 to be operated at substantially ground potential. Resistors 56 and 57 are chosen to provide rated current to the filaments while establishing the required D.C. voltage level for the second stage 50.

Stabilized plate voltage for the first stage is provided by connecting load resistance 46 to point 52. For the second stage, a voltage divider including resistances 59 and 61 supplies plate voltage via a plate load resistor 62.

Stable screen voltage for the second stage amplifier 50 is obtained by connection to point 52.

Amplifier stage 50 is direct-coupled to a triode buffer amplifier stage 60 via a stopper resistor 63. The cathode of triode 60 is connected through a resistance 64 and a zener diode 65 to ground potential. The junction of resistance 64 and zener diode 65 is returned to B+ via a resistance 66 and maintained at a substantially constant D.C. potential by a capacitor 67. A plate load resistance 68 is provided for the triode 60.

The last stage 70 comprises a cathode follower operating between substantially equal B+ and B− potentials. This stage is connected by a coupling resistance 72 to the plate of the preceding amplifier 60 and is provided with a plate stopper resistance 74, a cathode resistance 76, and a grid resistance 78. The cathode of triode 70 is connected in common with the output terminal 70a and the suppression voltage supply 80 which is described in detail hereinafter.

The suppression circuit 80 is of the zener-regulated bridge compensating type. The circuit includes a half-wave rectifier 81, filtering resistor 82 and capacitors 83 and 84 connected across the secondary winding of a transformer 85, which is electrically isolated by shielding and physically separated from other transformer windings to reduce coupling effects. The primary winding of transformer 85 is energized by an A.C. source 86. A temperature-compensated zener diode 88 is placed in the oven 24 and connected to one arm of a bridge 90 which comprises resistors 92, 94, and 96. The voltage across zener diode 88 may vary slightly due to line voltage fluctuations; however, the voltage fluctuation across output supply terminals 98 and 100 can be minimized by setting $$R_{92}/R_{88}=R_{94}/R_{96} \quad (1)$$

where $R_{88}$ is the zener impedance of diode 88, and each resistance value has a subscript in accordance with the resistor having the same reference numeral. By properly selecting the values of resistance, a potential having the polarity shown can be set up. A center-scale potentiometer 102 in series with a span potentiometer 104 is connected across suppression voltage supply output terminals 98 and 100. A movable tap 102a of potentiometer 102 is connected to the lower end of the high resistance 42 and terminal 100 of the suppression voltage supply 80 is connected to the output of the cathode follower stage 70.

The operation of the circuit of FIG. 2 proceeds in the following manner:

It will be apparent to one skilled in the art that the grid of the electrometer tube 40 remains very near ground potential regardless of input signal variations; that the output voltage with respect to ground follows the signal variations occurring across high resistance 46; and that the amplifying system performs an impedance transformation function by matching a transducer element (not shown) to an indicating meter without distorting the signal being measured. The dial of potentiometer 102 may be calibrated so that an adjustment of the arm thereof to just buck out a signal change as indicated on a meter connected to the output terminals is representative of a specific magnitude. Alternatively, the potentiometer arm 102a may be set to a desired "center scale" value and input signal variations on either side of this setting may be read out on a zero center reading meter 106 connected to the output terminal 70a.

Zero drift in the low-level stages 40 and 50 is largely determined by ambient temperature changes. A shift in operating point for these tubes may result from either a change in the supplied operating potentials or from changes in the circuit parameters. These latter two changes may be temperature sensitive. As a result, an input signal may not be accurately determined from the output signal as developed by the cathode follower stage 70. To prevent oscillation of the system, a compensating lag network comprising a series RC circuit may be connected between the plate of stage 50 to ground. The resultant deterioration of high frequency response may be objectionable in certain applications. If this is the case, reference may be made to P. H. Hammond's "Feedback Theory and Its Applications" for a transitional lead network more suitable.

With the present invention, when measuring an unknown potential, the preamplifier stages 40 and 50 and the buffer amplifier stage 60 accurately amplify any input signal introduced at input terminals 40a. The cathode follower stage 70 receives the amplified signal and provides an output signal at terminal 70a. Zeroing of the system is accomplished by shorting the input terminal 40a to the output terminal 70a, for example, by running the potentiometer arm 102a to the right-hand end of potentiometer 102 and adjusting the screen voltage on the electrometer tube 40 by means of a potentiometer 48 connected between the regulated point 52 to ground until a zero indication is read on meter 106. The zener diodes 54 and 55 maintain the preamplifier heater supply terminal 52 at a substantially constant potential regardless of fluctuations in the supply potential B+ provided by a low voltage power supply (not shown). By mounting the diodes in the temperature-controlled oven 24, a filament voltage regulation of the order of 0.001% is achieved for a wide range of ambient conditions.

The screen and anode potential of the input tube 40 is stabilized in a similar manner so that the operating point is maintained substantially constant. A maximum overall drift of two millivolts per day is quite common.

The zener-regulated suppression voltage supply 80 delivers across terminals 98 and 100 a constant output voltage unaffected by temperature, load current, or the voltage of source 86. To maintain its stability, the zener diode 88 is also located in the oven 24. In the balanced bridge circuit shown, the potential across terminals 98 and 100 is regulated to a high degree so that the portion tapped off by the potentiometer 102 is not a function either of the temperature or of the A.C. supply voltage provided by the source 86. With the improved regulation of filament voltage, plate voltage and bucking supply voltage, the per diem drift of the system is substantially zero. This means measurements of an unknown signal current will be more accurately reproduced than heretofore possible.

While certain and specific embodiments have been described herein, many changes and modifications may be made thereto without departing from the true spirit and scope of the invention as set forth in the appended claims.

What is claimed is:

1. An electrometer amplifier which comprises an input stage, an output stage, a degenerative feedback loop connecting said output stage to said input stage, a source of operating voltage, first regulator means including a first temperature-compensated zener diode and a first resistor connected in series across said source of operating voltage, a source of bucking voltage, second regulator means including a second temperature-compensated zener diode and a second resistor connected across said bucking voltage source, an enclosure containing said amplifier input stage and said first and second zener diodes, means for maintaining said enclosure at a substantially constant temperature so as to shield said amplifier input stage against ambient temperature changes and to maintain constant voltages across said first and second zener diodes, means for connecting said constant voltage across said first zener diode to said amplifier input stage to provide an operating voltage therefor, and means for connecting an adjustable portion of said constant voltage across said second zener diode in series with said feedback loop.

2. An electrometer amplifier which comprises an input stage, an output stage, a degenerative feedback loop connecting said output stage to said input stage, a source of operating voltage, first regulator means including a first temperature-compensated zener diode connected to said source of operating voltage, a source of bucking voltage, second regulator means including a second temperature-compensated zener diode connected across said bucking voltage source, means for enclosing said amplifier input stage and said first and second zener diodes in a temperature-controlled environment, said enclosing means including an oven, means for heating the interior of said oven, sensing means communicating with the interior of said oven and responsive to the temperature therein for energizing said heating means whenever said interior temperature is less than a desired value which is higher than expected ambient temperatures so as to shield said amplifier input stage against ambient temperature changes and to maintain constant voltages across said first and second zener diodes, means for connecting said constant voltage across said first zener diode to said amplifier input stage to provide an operating voltage therefor, and means for connecting an adjustable portion of said constant voltage across said second zener diode in series with said feedback loop.

3. An electrometer amplifier which comprises an input stage, an output stage, a degenerative feedback loop connecting said output stage to said input stage, a source of operating voltage, first regulator means including a first zener diode connected to said operating voltage source, a source of bucking voltage, second regulator means connected across said bucking voltage source, said second regulator means including an unbalanced resistive compensating bridge at least one arm of which includes a second temperature-compensated zener diode, means for enclosing said amplifier input stage and said first and second zener diodes in a temperature-controlled environment said enclosing means comprising an oven which is automatically maintained at a substantially constant temperature about ambient temperatures so as to shield said amplifier input stage from ambient temperature changes and to maintain constant voltages across said first zener diode and across said compensating bridge, means for connecting said constant voltage across said first zener diode to said amplifier input stage to provide an operating voltage therefor, and means for connecting an adjustable portion of said constant voltage across said compensating bridge in series with said feedback loop.

4. An electrometer amplifier comprising an input stage, an output stage, and a degenerative feedback loop connecting said output stage to said input stage, a source of operating voltage, first regulator means including a first temperature-compensated zener diode connected to said operating voltage source, a source of bucking voltage, second regulator means including a second temperature-compensated zener diode connected across said bucking voltage source; means for enclosing said amplifier input stage and said first and second zener diodes in a temperature-controlled environment, said enclosing means including an oven, means for heating the interior of said oven, sensing means communicating with the interior of said oven for generating a signal proportional to the temperature of said oven interior, controller means responsive to said generated signal for energizing said heating means when ever said interior temperature is less than a desired value therefor; means for connecting the constant voltage thereupon developed by said first regulator to supply an operating voltage to said amplifier input stage, and means for connecting an adjustable portion of the constant voltage developed by said second regulator in series with said feedback loop.

5. An electrometer amplifier which comprises an input stage including an electrometer tube having a cathode, a plate and a control grid for receiving a high impedance input signal to be amplified; an output stage in said amplifier, means for coupling said input stage to said output stage so as to make said output stage responsive to signals from said input stage for providing an amplified signal which varies both with said received signal and with drift arising from variations in the operating conditons of said electrometer tube due to changes in the temperature of the surroundings, a circuit point of reference potential in said amplifier, a degenerative feedback loop including a high ohmage resistor for coupling said amplified signal to said control grid to maintain the potential thereof substantially constant at said reference potential while providing a high-impedance load for said input signal, a source of operating voltage, a zener diode and a resistive element connected in series across said source of operating voltage; an enclosure surrounding said zener diode, said electrometer tube and said high ohmage resistor; means for maintaining the temperature in said enclosure substantially constant so as to shield said electrometer tube, said high ohmage resistor and said zener diode against ambient temperature changes and to thereby produce a constant zener voltage across said zener diode; a cathode resistor connected between said cathode of said electrometer tube and said point of reference potential and a cathode circuit means for applying a portion of said constant zener voltage produced across said zener diode to provide a cathode bias voltage across said cathode resistor.

6. An amplifier as in claim 5, wherein said zener diode comprises a temperature-compensated zener diode for producing a zener voltage substantially greater than said cathode bias voltage, and wherein said cathode circuit further includes voltage dropping resistance means in series with said cathode resistor, whereby a variation in said zener voltage produces a variation in said cathode bias voltage which is reduced by a factor proportional to the ratio of the resistance of said cathode resistor to the sum of the resistances of said cathode resistor and said dropping resistance means.

7. An amplifier as in claim 6 wherein said dropping resistance is mounted in said constant-temperature enclosure.

8. An amplifier as in claim 5 wherein said cathode of said electrometer tube comprises a filament cathode connected in series with said cathode resistor whereby a constant current through both said filament and said cathode resistor is produced by the application of said zener voltage portion across the series-connected circuit.

9. An amplifier as in claim 5 which further comprises a variable potentiometer energized by said constant voltage produced across said zener diode, and wherein said electrometer tube contains a second control grid receiving an adjustable bias potential from said potentiometer, whereby said amplifier can be zeroed to compensate for long-term drift while maintaining a constant voltage across said cathode bias resistor.

10. An amplifier as in claim 5 which further comprises a plate load resistor mounted in said constant-temperature enclosure and connected between said plate of said electrometer tube and said zener diode, a second electrometer tube coupled between said amplifier input and output stages, said second electrometer tube having a control grid which is connected to the junction of said plate and said plate load resistor and a filament cathode, wherein said zener diode comprises a temperature-compensated zener diode for producing a zener voltage substantially greater than said cathode bias voltage for said first electrometer tube, and wherein said cathode circuit includes the filament of both said electrometer tubes with a dropping resistor therebetween to raise the cathode potential of said second electrometer tube above the plate potential of said first electrometer tube.

11. An amplifier as in claim 5 which further comprises a bucking voltage source, a second zener diode mounted in said constant temperature enclosure, a second resistive element connected in series with said second zener diode across said source of bucking voltage, a variable potentiometer, circuit means for connecting said potentiometer to said second zener diode so as to produce across said potentiometer a suppression voltage which is substantially independent of ambient temperature changes, and means for connecting said potentiometer in said feedback loop so as to add a variable portion of said suppression voltage to said amplifier output voltage coupled to said control grid through said high ohmage resistor, whereby zero output voltage can be obtained for any desired value of said input signal to be amplified.

References Cited by the Examiner

UNITED STATES PATENTS

| | | | |
|---|---|---|---|
| 2,433,554 | 12/1947 | Herzog | 250—83.6 |
| 2,651,726 | 9/1953 | Froman et al. | 330—201 X |
| 2,731,564 | 1/1956 | Edlstein | 328—3 X |
| 2,829,268 | 4/1958 | Chope | 250—83.3 |
| 2,862,046 | 11/1958 | Relis | 330—140 X |
| 2,965,847 | 12/1960 | Radley | 250—83.3 |
| 3,013,104 | 12/1961 | Young. | |
| 3,109,082 | 10/1963 | Polaniecki | 331—69 X |

OTHER REFERENCES

Article by Bukstein in Radio-Electronics, November 1958, p. 35.

Article by Toback in Electronic Industries, December 1958, pp. 64–66.

Silicon Zener Diode and Rectifier Handbook, Motorola, Inc., (pp. 99–101), 1961.

ROY LAKE, *Primary Examiner.*

R. P. KANANEN, F. D. PARIS, *Assistant Examiners.*